(12) United States Patent
Oberlander et al.

(10) Patent No.: US 12,207,593 B2
(45) Date of Patent: Jan. 28, 2025

(54) QUICK STORAGE CRADLE FOR COMBINE MULTICOUPLER

(71) Applicant: CNH Industrial America LLC, New Holland, PA (US)

(72) Inventors: Joseph Oberlander, Durant, IA (US); Joel T. Cook, Akron, PA (US); Nathaniel Smith, Lancaster, PA (US)

(73) Assignee: CNH Industrial America LLC, New Holland, PA (US)

( * ) Notice: Subject to any disclaimer, the term of this patent is extended or adjusted under 35 U.S.C. 154(b) by 708 days.

(21) Appl. No.: 17/391,654

(22) Filed: Aug. 2, 2021

(65) Prior Publication Data
US 2023/0030953 A1 Feb. 2, 2023

(51) Int. Cl.
  *A01D 41/16* (2006.01)
  *A01D 41/14* (2006.01)
  *A01D 67/00* (2006.01)

(52) U.S. Cl.
  CPC .......... *A01D 41/16* (2013.01); *A01D 41/142* (2013.01); *A01D 41/145* (2013.01); *A01D 67/005* (2013.01)

(58) Field of Classification Search
  CPC ...... B60D 1/64; A01B 59/002; A01D 67/005; A01D 41/16; A01D 41/145; A01D 41/142; A01D 41/14
  See application file for complete search history.

(56) References Cited

U.S. PATENT DOCUMENTS

| 5,832,705 | A | 11/1998 | Eis et al. | |
|---|---|---|---|---|
| 6,519,923 | B1 * | 2/2003 | Cooksey | A01D 41/127 56/14.9 |
| 6,619,020 | B1 | 9/2003 | Chaney et al. | |
| 6,735,929 | B2 * | 5/2004 | Watts | A01B 71/06 56/14.9 |
| 7,686,563 | B2 | 3/2010 | Frey et al. | |
| 7,963,054 | B2 | 6/2011 | Wimmer et al. | |
| 8,631,634 | B2 * | 1/2014 | Vereecke | A01D 41/16 56/14.9 |
| 9,137,946 | B2 * | 9/2015 | Verhaeghe | A01D 41/16 |
| 9,743,588 | B2 | 8/2017 | Dreer et al. | |
| D868,948 | S * | 12/2019 | Clifford | D8/382 |

(Continued)

FOREIGN PATENT DOCUMENTS

| AT | 2436 U1 * | 10/1998 | ............. F16B 21/12 |
|---|---|---|---|
| EP | 0 676 123 A1 | 10/1995 | |

(Continued)

OTHER PUBLICATIONS

International Search Report and Written Opinion for Application No. PCT/US2022/39028 dated Nov. 24, 2022 (10 Pages).

*Primary Examiner* — Arpad Fabian-Kovacs
(74) *Attorney, Agent, or Firm* — Peter K. Zacharias; Rebecca L. Henkel; Rickard K. DeMille

(57) ABSTRACT

An agricultural harvester including a header assembly, includes: a multicoupler storage assembly including: a multicoupler assembly including a plurality of at least one of hydraulic connectors and electrical connectors; and a cradle mechanism configured for storing the multicoupler assembly and for selectively pivoting between a receiving position associated with the cradle mechanism receiving the multicoupler assembly and a storage position associated with the cradle mechanism storing the multicoupler assembly.

18 Claims, 7 Drawing Sheets

(56) References Cited

U.S. PATENT DOCUMENTS

| | | | |
|---|---|---|---|
| D869,615 S * | 12/2019 | Trowbridge | ................... D8/382 |
| 2003/0172637 A1 | 9/2003 | Watts et al. | |
| 2005/0285390 A1* | 12/2005 | Martin | ................... F16L 37/18 |
| | | | 285/124.5 |
| 2006/0022455 A1 | 2/2006 | Mieger et al. | |
| 2008/0036199 A1* | 2/2008 | Asam | ...................... F16L 37/56 |
| | | | 285/33 |
| 2008/0271425 A1 | 11/2008 | Ricketts et al. | |
| 2013/0219846 A1 | 8/2013 | Verhaeghe et al. | |
| 2016/0057934 A1* | 3/2016 | Dreer | ................... A01D 67/005 |
| | | | 56/13.5 |
| 2016/0109044 A1* | 4/2016 | Danelli | ................... F16L 21/08 |
| | | | 285/120.1 |
| 2016/0360698 A1* | 12/2016 | Ducroquet | ........... A01D 41/142 |
| 2019/0327877 A1* | 10/2019 | Schibel | ................. A01B 59/066 |
| 2020/0267888 A1 | 8/2020 | Putz | |

FOREIGN PATENT DOCUMENTS

| | | | | |
|---|---|---|---|---|
| EP | 2274967 A1 * | 1/2011 | ........... | A01B 59/002 |
| EP | 4144204 A1 * | 3/2023 | ........... | A01D 41/127 |

* cited by examiner

QUICK STORAGE CRADLE FOR COMBINE MULTICOUPLER

FIELD OF THE INVENTION

The present invention pertains to an agricultural harvester, and, more specifically, to a storage mechanism for a multicoupler for hydraulically and/or electrically interconnecting the agricultural harvester and a header.

BACKGROUND OF THE INVENTION

An agricultural harvester known as a "combine" is historically termed such because it combines multiple harvesting functions with a single harvesting unit, such as picking, threshing, separating, and cleaning. A combine includes a header which removes the crop from a field, and a feeder housing which transports the crop matter into a threshing rotor. The threshing rotor rotates within a perforated housing, which may be in the form of adjustable concaves, and performs a threshing operation on the crop to remove the grain. Once the grain is threshed it falls through perforations in the concaves onto a grain pan. From the grain pan the grain is cleaned using a cleaning system, and is then transported to a grain tank onboard the combine. A cleaning fan blows air through the sieves to discharge chaff and other debris toward the rear of the combine. Non-grain crop material such as straw from the threshing section proceeds through a residue handling system, which may utilize a straw chopper to process the non-grain material and direct it out the rear of the combine. When the grain tank becomes full, the combine is positioned adjacent a vehicle into which the grain is to be unloaded, such as a semi-trailer, gravity box, straight truck, or the like, and an unloading system on the combine is actuated to transfer the grain into the vehicle.

More particularly, a rotary threshing or separating system includes one or more rotors that can extend axially (front to rear) or transversely (side to side) within the body of the combine, and which are partially or fully surrounded by perforated concaves. The crop material is threshed and separated by the rotation of the rotor within the concaves. Coarser non-grain crop material such as stalks and leaves pass through a straw beater to remove any remaining grains, and then are transported to the rear of the combine and discharged back to the field. The separated grain, together with some finer non-grain crop material such as chaff, dust, straw, and other crop residue are discharged through the concaves and fall onto a grain pan where they are transported to a cleaning system. Alternatively, the grain and finer non-grain crop material may also fall directly onto the cleaning system itself.

A cleaning system further separates the grain from non-grain crop material, and typically includes a fan directing an airflow stream upwardly and rearwardly through vertically arranged sieves which oscillate in a fore and aft manner. The airflow stream lifts and carries the lighter non-grain crop material towards the rear end of the combine for discharge to the field. Clean grain, being heavier, and larger pieces of non-grain crop material, which are not carried away by the airflow stream, fall onto a surface of an upper sieve (also known as a chaffer sieve), where some or all of the clean grain passes through to a lower sieve (also known as a cleaning sieve). Grain and non-grain crop material remaining on the upper and lower sieves are physically separated by the reciprocating action of the sieves as the material moves rearwardly. Any grain and/or non-grain crop material which passes through the upper sieve, but does not pass through the lower sieve, is directed to a tailings pan. Grain falling through the lower sieve lands on a bottom pan of the cleaning system, where it is conveyed forwardly toward a clean grain auger. The clean grain auger conveys the grain to a grain elevator, which transports the grain upwards to a grain tank for temporary storage. The grain accumulates to the point where the grain tank is full and is discharged to an adjacent vehicle such as a semi-trailer, gravity box, straight truck or the like by an unloading system on the combine that is actuated to transfer grain into the vehicle.

There are a variety of headers (which can also be referred to as a head or a header assembly). These include, but are not limited to, corn heads, draper heads (which can include a flexible or rigid cutterbar), flex auger heads, and pickup heads. Any such header includes a way to make hydraulic and electrical connections with the combine. That is, the combine can include a hydraulic system that includes hydraulic fluid that fluidly communicates with a hydraulic system of the header, as well as an electrical system that communicates electrical power and communications with the header. For example, a flexible draper header can include a hydraulic system that can selectively adjust a reel, such as raising or lowering the reel or moving the reel fore or aft, can control reel speed, can control the flex of the header (such as the cutterbar), and can selectively deploy transport wheels of the header to transport the header when not harvesting. The electrical system can include electrical power for lights on the header, as well as control lines for communicating information from header sensors to the combine or for controlling functions of the header, such as adjustment of the reel or deployment of the transport wheels. Such hydraulic and electrical functions are mentioned by way of example and not by way of limitation and are well-known to those skilled in the art.

A multicoupler attached to the header can be used to make connections between the hydraulic and electrical systems of the combine and the header, such connections being made during setup of the header for use in a field to be harvested. The multicoupler can include a base that holds a plurality of hydraulic and electrical connectors (which themselves connect with a plurality of hydraulic and electrical lines of the header), which can matingly connect with a plurality of hydraulic and electrical connectors of the combine, so as to interconnect the header with the combine hydraulically and electrically for the various hydraulic and electrical functions of the header, as is well-known in the art. However, when the header is disconnected from the combine, the multicoupler needs to be stored on the header, such as on the header frame.

A known device for storing the multicoupler when not in use stores the multicoupler at a downward angle in an effort to prevent accumulation of water. The device maintains the multicoupler open to the elements, such that dust and debris can accumulate when, for example, residual oil is present on hydraulic and electrical connectors of the multicoupler. Further, the multicoupler must be held in place while a secondary latch is rotated around to lock the multicoupler in place.

What is needed in the art is a way to store the multicoupler on the header or the combine so as to prevent collection of dirt and debris on, as well as spoliation by water of, the multicoupler connectors.

SUMMARY OF THE INVENTION

The present invention provides a multicoupler storage assembly on the header or the agricultural harvester, which prevents collection of dirt and debris on, as well as spoliation by water of, the multicoupler connectors of the header.

The invention in one form is directed to a header assembly of an agricultural harvester, the header assembly including: a frame; a multicoupler storage assembly at least partially coupled with the frame, the multicoupler storage assembly including: a multicoupler assembly including a plurality of at least one of hydraulic connectors and electrical connectors; and a cradle mechanism coupled with the frame and configured for storing the multicoupler assembly and for selectively pivoting between a receiving position associated with the cradle mechanism receiving the multicoupler assembly and a storage position associated with the cradle mechanism storing the multicoupler assembly.

The invention in another form is directed to an agricultural harvester including a header assembly, including: a multicoupler storage assembly including: a multicoupler assembly including a plurality of at least one of hydraulic connectors and electrical connectors; and a cradle mechanism configured for storing the multicoupler assembly and for selectively pivoting between a receiving position associated with the cradle mechanism receiving the multicoupler assembly and a storage position associated with the cradle mechanism storing the multicoupler assembly.

The invention in yet another form is directed to a method of using a multicoupler storage assembly of an agricultural harvester including a header assembly, including the steps of: providing the multicoupler storage assembly, which includes a multicoupler assembly and a cradle mechanism, the multicoupler assembly including a plurality of at least one of hydraulic connectors and electrical connectors; receiving the multicoupler assembly by the cradle mechanism; pivoting, selectively, the cradle mechanism between a receiving position associated with the cradle mechanism receiving the multicoupler assembly and a storage position associated with the cradle mechanism storing the multicoupler assembly; and storing the multicoupler assembly by the cradle mechanism.

An advantage of the present invention is that it provides a multicoupler storage assembly that securely stores the hydraulic/electrical multicoupler assembly on the combine header or the combine while the header or the combine is not in use, so as to protect the hydraulic and electrical connections from the elements, such as dirt, debris, and water, thereby keeping them clean and dry while stowed.

Another advantage of the present invention is that it provides a multicoupler storage assembly that can include a positive retention mechanism.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

The terms "grain", "straw" and "tailings" are used principally throughout this specification for convenience but it is to be understood that these terms are not intended to be limiting. Thus "grain" refers to that part of the crop material which is threshed and separated from the discardable part of the crop material, which is referred to as non-grain crop material, MOG or straw. Incompletely threshed crop material is referred to as "tailings". Also, the terms "forward", "rearward", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting. The terms "downstream" and "upstream" are determined with reference to the intended direction of crop material flow during operation, with "downstream" being analogous to "rearward" and "upstream" being analogous to "forward."

Figure 1:
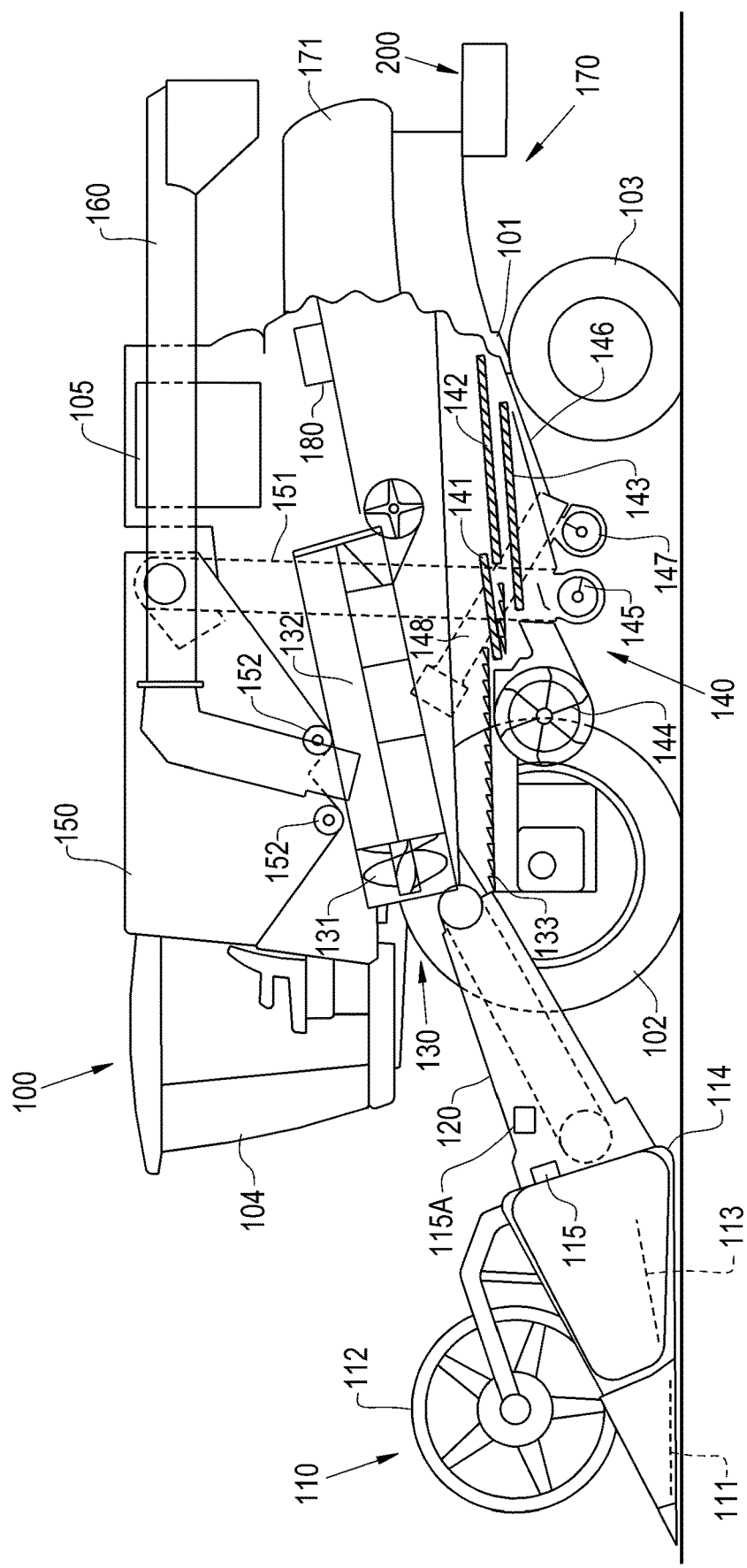
FIG. 1 illustrates a side view of an exemplary embodiment of an agricultural vehicle, the agricultural vehicle comprising a header assembly, in accordance with an exemplary embodiment of the present invention.

Referring now to the drawings, and more particularly to FIG. 1, there is shown an embodiment of an agricultural harvester 100 in the form of a combine; combine 100 shown in FIG. 1 and described herein merely by way of example, not by way of limitation, such that any and all different types or versions of combines are intended to fall within the scope of the present invention. Combine 100 generally includes a chassis 101, ground engaging wheels 102 and 103, header 110, feeder housing 120, operator cab 104, threshing and separating system 130, cleaning system 140, grain tank 150, and unloading conveyance 160. Front wheels 102 are larger flotation type wheels, and rear wheels 103 are smaller steerable wheels. Motive force is selectively applied to front wheels 102 through a power plant in the form of a diesel engine 105 and a transmission (not shown). Although combine 100 is shown as including wheels, is also to be understood that combine 100 may include tracks, such as full tracks or half tracks.

Header 110 is mounted to the front of combine 100 and includes a cutterbar 111 (shown schematically) for severing crops from a field during forward motion of combine 100. A rotatable reel 112 feeds the crop into header 110, and side drapers 113 (shown schematically) feed the severed crop laterally inwardly from each side toward center drapers and onward to feeder housing 120. Feeder housing 120 conveys the cut crop to threshing and separating system 130, and is selectively vertically movable using appropriate actuators, such as hydraulic cylinders (not shown). Header 110 also includes a frame 114 and can include a multicoupler storage assembly 115 (shown schematically in FIG. 1) coupled with frame 114, multicoupler storage assembly 115 being positioned, according to one exemplary embodiment of the present invention, left of a fore-to-aft centerline of header 110, more specifically, left of feeder housing 120 (when header 110 is attached to combine 100), such that a multicoupler assembly 222 (FIG. 2) of multicoupler storage assembly 115 can readily couple with a coupling mechanism of combine 100 on or about feeder housing 120 (or to the frame associated with feeder housing 120) which enables the hydraulic and electrical system of header 110 to interconnect (mechanically, fluidly, and electrically) with the hydraulic and electrical system of combine 100, in known manner. Alternatively, according to another embodiment of the present invention, multicoupler storage assembly 115 can be attached to feeder housing 120 (or to the frame associated with feeder housing 120), rather than to header 100. This alternative embodiment is shown schematically as multicoupler storage assembly 115A in FIG. 1, but it is understood that only one of multicoupler storage assembly 115 and 115A is needed to make the connections and that 115 and 115A are provided as alternative locations for essentially the same assembly (though both 115 and 115A can be employed). That is, multicoupler storage assemblies 115 and 115A are identical, or substantially similar, to one another, such that a description of one serves as a sufficient description of the other. Further, if multicoupler storage assembly 115A is used, then a coupling mechanism would be located on header, to enable the hydraulic and electrical system of combine 100 to interconnect with the hydraulic and electrical system of header 110. Further, multicoupler storage assembly 115A can mount to, for example, feeder housing 120 (or to the frame associated with feeder housing 120) by way of a holder (not shown) that is similar to holder 216 (below), including, for instance, a pivotal connection between the holder and a cradle mechanism of assembly 115A, a slot 221 in the holder, a spring 224 attached to the holder, and a linchpin assembly 225 together with storage and locking holes 343, 344 of the holder for a linchpin 241 (all described below with specific reference to assembly 115).

Threshing and separating system 130 is of the axial-flow type, and generally includes a threshing rotor 131 at least partially enclosed by a rotor cage and rotatable within a corresponding perforated concave 132. The cut crops are threshed and separated by the rotation of rotor 131 within concave 132, and larger elements, such as stalks, leaves and the like are discharged from the rear of combine 100. Smaller elements of crop material including grain and non-grain crop material, including particles lighter than grain, such as chaff, dust and straw, are discharged through perforations of concave 132. Threshing and separating system 130 can also be a different type of system, such as a system with a transverse rotor rather than an axial rotor, etc.

Grain which has been separated by the threshing and separating assembly 130 falls onto a grain pan 133 and is conveyed toward cleaning system 140. Cleaning system 140 may include an optional pre-cleaning sieve 141, an upper sieve 142 (also known as a chaffer sieve or sieve assembly), a lower sieve 143 (also known as a cleaning sieve), and a cleaning fan 144. Grain on sieves 141, 142 and 143 is subjected to a cleaning action by fan 144 which provides an air flow through the sieves to remove chaff and other impurities such as dust from the grain by making this material airborne for discharge from a straw hood 171 of a residue management system 170 of combine 100. Optionally, the chaff and/or straw can proceed through a chopper 180 to be further processed into even smaller particles before discharge out of the combine 100 by a spreader assembly 200. It should be appreciated that the "chopper" 180 referenced herein, which may include knives, may also be what is typically referred to as a "beater", which may include flails, or other construction and that the term "chopper" as used herein refers to any construction which can reduce the particle size of entering crop material by various actions including chopping, flailing, etc. Grain pan 133 and pre-cleaning sieve 141 oscillate in a fore-to-aft manner to transport the grain and finer non-grain crop material to the upper surface of upper sieve 142. Upper sieve 142 and lower sieve 143 are vertically arranged relative to each other, and likewise oscillate in a fore-to-aft manner to spread the grain across sieves 142, 143, while permitting the passage of cleaned grain by gravity through the openings of sieves 142, 143.

Clean grain falls to a clean grain auger 145 positioned crosswise below and toward the front of lower sieve 143. Clean grain auger 145 receives clean grain from each sieve 142, 143 and from a bottom pan 146 of cleaning system 140. Clean grain auger 145 conveys the clean grain laterally to a generally vertically arranged grain elevator 151 for transport to grain tank 150. Tailings from cleaning system 140 fall to a tailings auger trough 147. The tailings are transported via tailings auger 147 and return auger 148 to the upstream end of cleaning system 140 for repeated cleaning action. A pair of grain tank augers 152 at the bottom of grain tank 150 convey the clean grain laterally within grain tank 150 to unloader 160 for discharge from combine 100.

Figure 2:
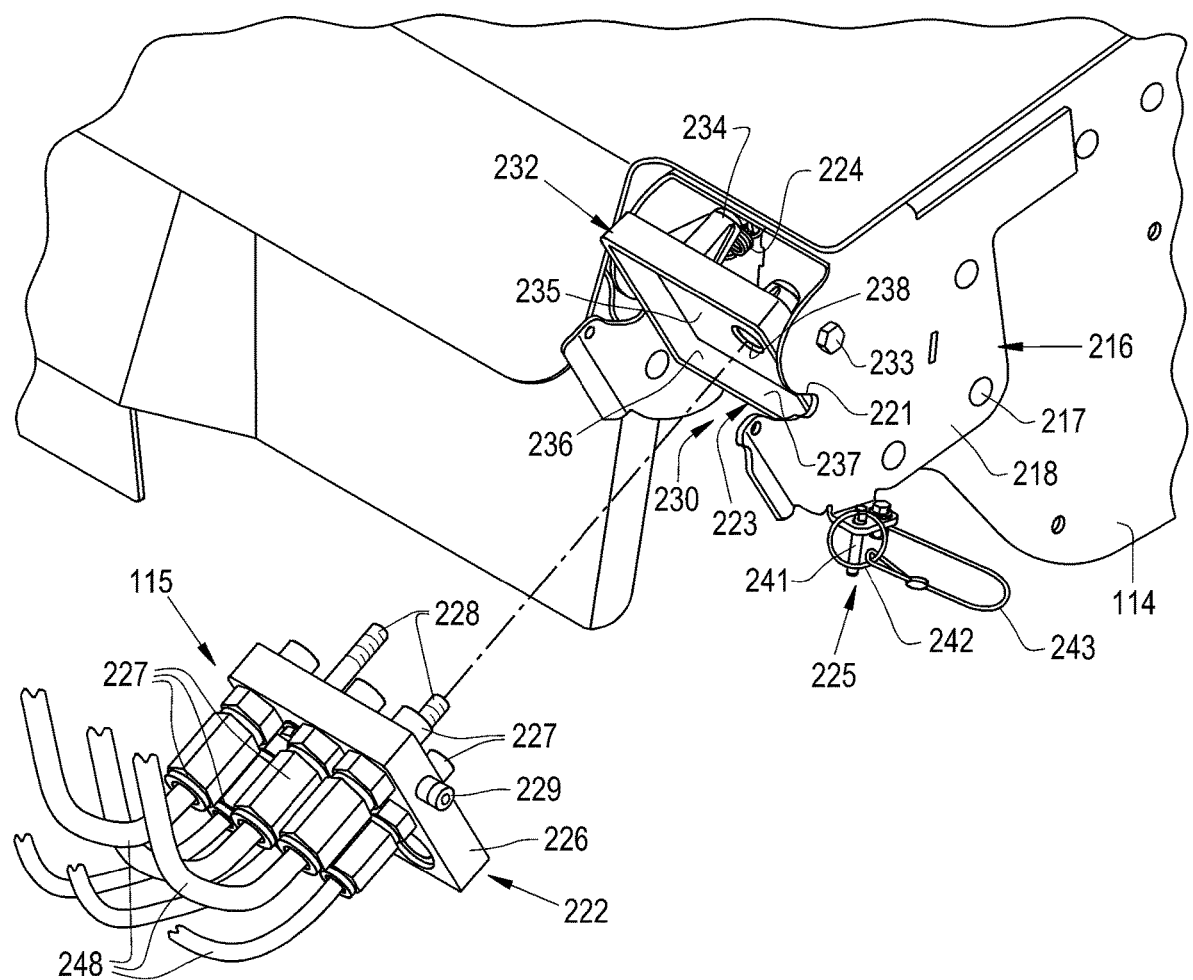
FIG. 2 illustrates a perspective view of a frame of the header assembly, with portions broken away, and a multicoupler storage assembly of FIG. 1, in accordance with an exemplary embodiment of the present invention.
Figure 3:
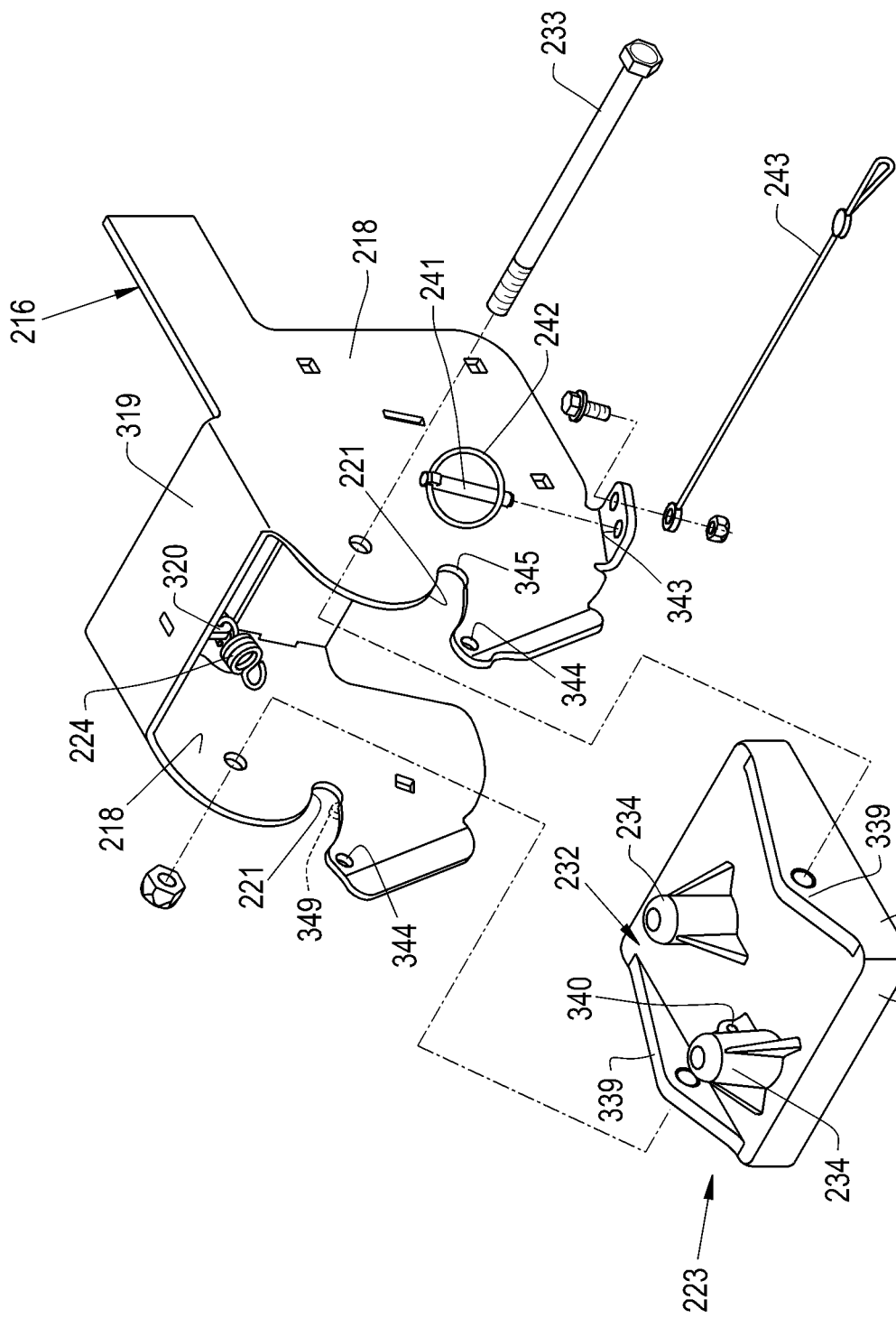
FIG. 3 illustrates a perspective, exploded view of the frame and multicoupler storage assembly of FIG. 2, less a multicoupler assembly of the multicoupler storage assembly.
Figure 4:
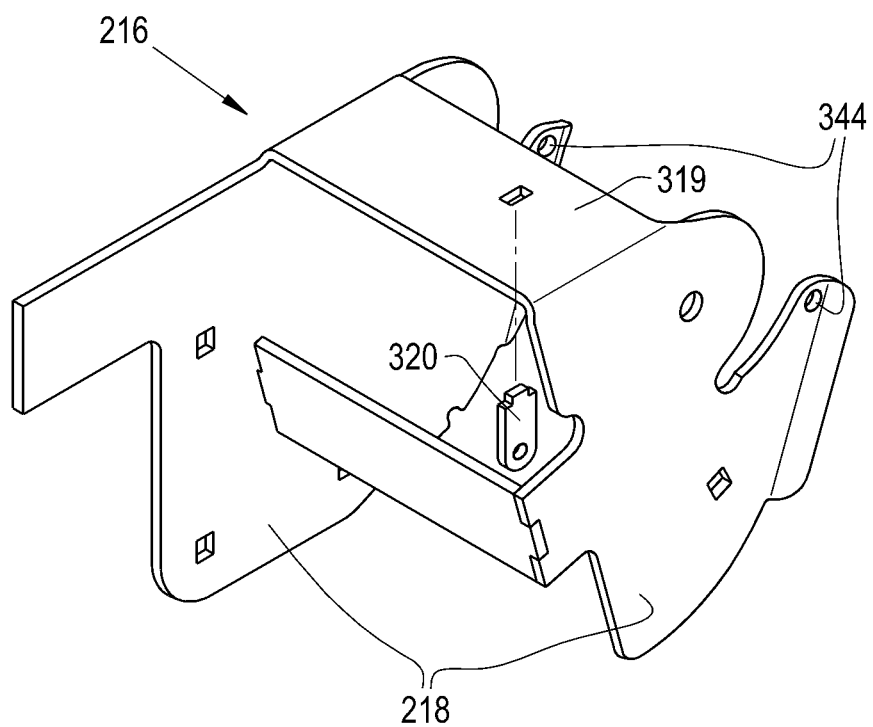
FIG. 4 illustrates a perspective view of a holder of the frame of FIG. 2.

Referring now to FIGS. 2-4, there is shown frame 114 and multicoupler storage assembly 115. In FIG. 2, multicoupler storage assembly 115 is at least partially attached to, or otherwise coupled with, frame 114. Frame 114 can include a holder 216. Holder 216 can be attached to, or otherwise coupled with, other portions of frame 114 by way of fasteners 217, such as rivets or any other suitable fasteners (as shown in FIG. 2)(and can thus be referred to as a bracket), or can be welded to frame 114, or can be otherwise formed integral with frame 114. Holder 216 can be made of any suitable material, such as a metal, such as steel. Holder 216 can be stamped or otherwise formed and serves to pivotably hold a cradle mechanism 223 and thereby couple cradle mechanism 223 with other portions of frame 114. Holder 216 can include two substantially parallel side walls 218, a top wall 319 interconnecting side walls 218, and an attachment device 320 (which can be referred to as a projection, tab, or lug) connected to top wall 319, such as by way of welding. Side walls 218 can each define an arcuate slot 221 that has been cut or otherwise machined into side walls 218. Attachment device 320 can include a throughhole which receives one end of a spring 224 therethrough.

Multicoupler storage assembly 115 can include a multicoupler assembly 222, a cradle mechanism 223, a spring 224, and a linchpin assembly 225. FIG. 2 shows multicoupler assembly 222 separated from, and thus not yet coupled with, cradle mechanism 223. Multicoupler assembly 216 includes a base 226, a plurality of hydraulic and/or electrical connectors 227 (meaning, at least two hydraulic connectors, at least two electrical connectors, or at least one hydraulic connector and at least one electrical connector), at least one guide pin 228 (two such guide pins being shown in FIG. 2), and side pins 229. Multicoupler assembly 222 is to be stored when not in use by way of holder 216 and cradle mechanism 223, as explained below. Further, multicoupler assembly 222, when in use, couples with a coupling mechanism (not shown) of combine 100 so as to matingly connect hydraulic and/or electrical connectors 227 of multicoupler assembly 222 with a plurality of hydraulic and/or electrical connectors (not shown) of combine 100, so as to interconnect header 110 with combine 100 hydraulically and electrically for the various hydraulic and electrical functions of header 110, as is well-known in the art. Base 226, which can be made of a metal or a plastic which can be injection molded, includes holes for holding hydraulic and/or electrical connectors 227. Hydraulic and/or electrical connectors 227 extend on both sides of base 226, one side (the right side in FIG. 2) of connectors 227 to mate with hydraulic and/or electrical connectors of combine 100, the other side (the left side in FIG. 2) of connectors 227 to connect with hydraulic hoses and/or electrical lines or cables 248 (hoses/lines/cables 248 are shown schematically only in FIG. 2), as is known in the art. Guide pins 228, which can be made of steel for example, or any suitable polymer or other material, are attached to and project from base 226 to the right in FIG. 2. Guide pins 228, when multicoupler assembly 222 is mounted to cradle mechanism 223, insert into guide pin receivers 234 of cradle mechanism 223. Side pins 229 extend from opposing lateral sides of base 226 and can be made of, for example, steel, which can be welded or otherwise bonded to base 226. Side pins 229 can be accommodated in slots 221 of holder 216, which are configured for slidably receiving respectively side pin 229 when cradle mechanism 223 moves, together with the multicoupler assembly 222, between a receiving position 230 (FIGS. 2 and 5) and a storage position 631 (FIG. 6) of cradle mechanism 223 (explained more fully below). Further, an alternative embodiment of slots 221 is shown in FIG. 3. That is, while both slots 221 should be substantially similar to one another, the left slot 221 (in the background of FIG. 3) is shown to include a detent 349 in broken lines, by way of example. In other words, both slots 221, according to one embodiment of the present invention, can be shaped so as not to include detent 349. On the other hand, both slots 221, according to another embodiment of the present invention, can include a detent 349 (it being understood that the right slot 221 could include detent 349, though not shown).

Cradle mechanism 223 is attached to, or otherwise coupled with, frame 114. Cradle mechanism 223 can include a base mechanism 232 (which can be referred to as a base), a pivot 233, and a plurality of guide pin receivers 234. Base mechanism 232 can include a main wall 235 and a plurality of side walls 236 (such as four, as shown in FIG. 2) extending from main wall 235, main wall 235 and side walls 236 defining a space 237 therebetween (despite that cradle mechanism 223 does not include another main wall facing main wall 235 and attached to side walls 236). Main wall 235 can further include a plurality of holes 238 aligned respectively with or otherwise formed respectively integral with guide pin receivers 234. Base mechanism 232 can further include opposing supports 339 positioned on a backside of main wall 235, each support 339 including a through-hole. By way of example and not limitation, base mechanism 232 can be made of a plastic and can be formed by way of injection molding; alternatively, base mechanism 232 can be formed from a sheet metal weldment. Pivot 233 can be formed as a bolt with a shaft extending between and through the holes of supports 339. Thus, pivot 233 can include a head positioned on an outside portion of a side wall 218 of holder 216, with the shaft of pivot 233 extending through a hole in that side wall 218 of holder 216, through the hole in one of the supports 339, across the backside of main wall 235, through the hole in the other of the supports 339, and through a hole in the opposing side wall 218 of holder 216, and can be fastened to holder 216 by way of, for example, a nut threaded onto an end of pivot 233 opposite the head of pivot 233. Thus, by way of pivot 233, cradle mechanism 223 is pivotably connected to holder 216. Guide pin receivers 234 (which can be substantially similar to one another) can be formed as blind holes extending from the backside of main wall 235, which can be attached to or formed integral with main wall 235 (and thus be formed of the same material as, and integral with, base mechanism 232). Guide pin receivers 234 are configured to receive respectively therein guide pins 228 of multicoupler assembly 222. At least one guide pin receiver 234 can include an external hole 340. Guide pin receivers 234 are vertically and horizontally offset from one another and include triangular supports extending to the backside of main wall 235 (three such supports, for example, can be provided spaced apart about a respective guide pin receiver 234). Base mechanism 232 and guide pin receivers can be formed integral with one another by way of injection molding.

Figure 5:
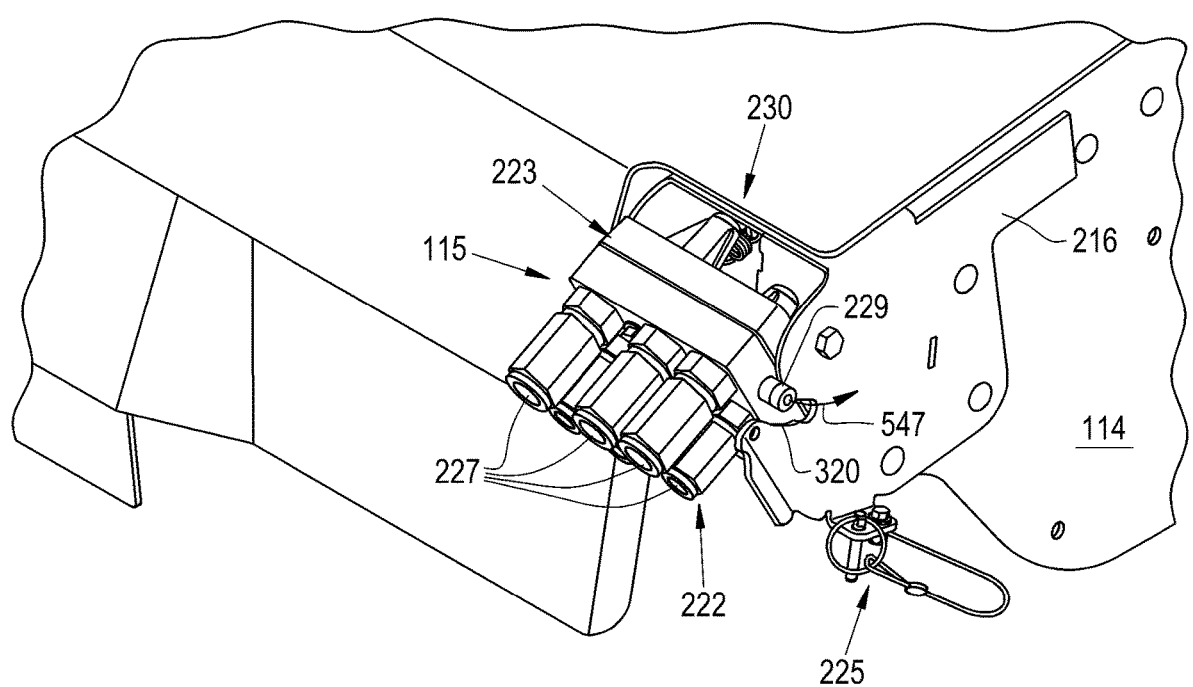
FIG. 5 illustrates a perspective view of the frame of the header assembly, with portions broken away, and the multicoupler storage assembly, with a cradle mechanism, together with the multicoupler assembly, in a receiving position.
Figure 6:
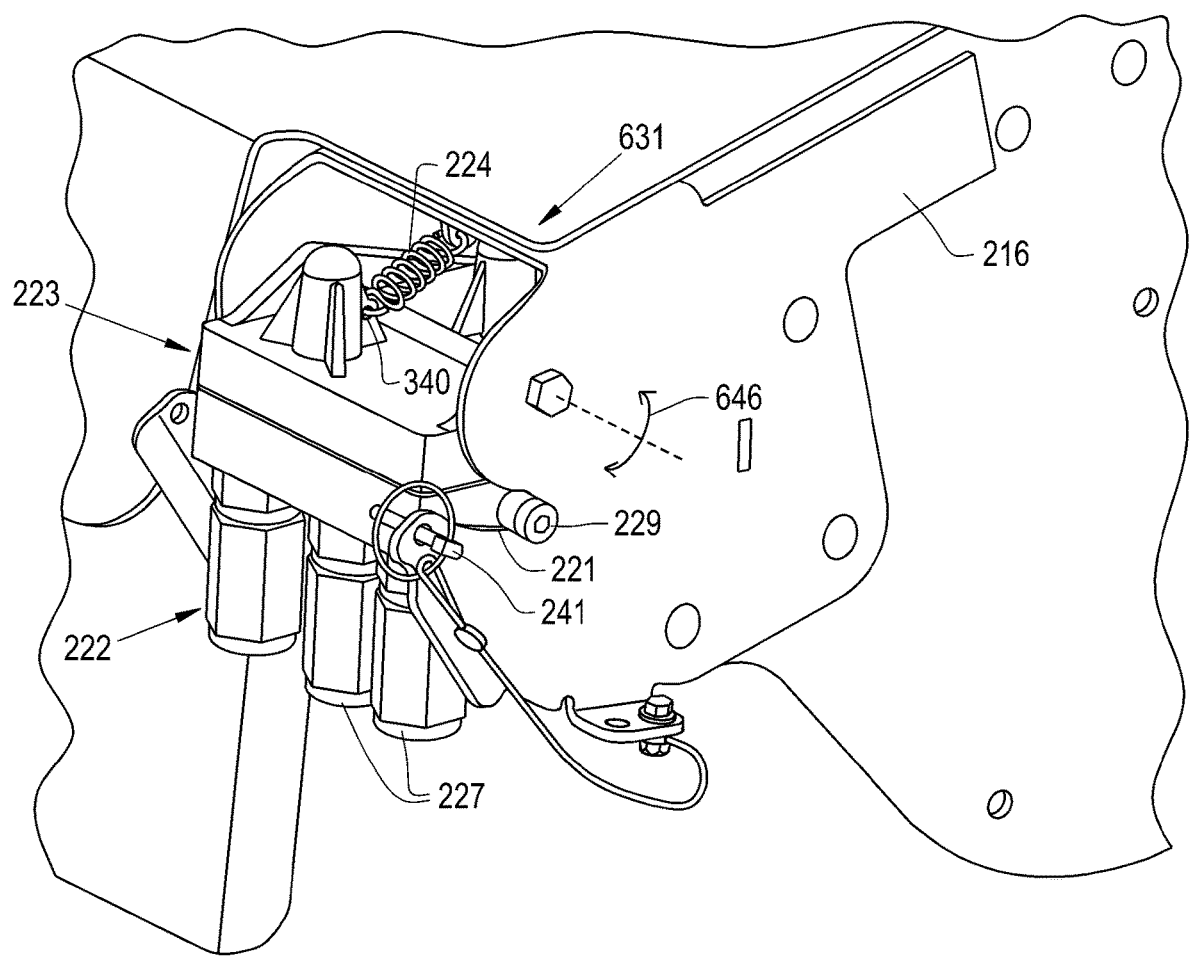
FIG. 6 illustrates a perspective view of the frame of the header assembly, with portions broken away, and the multicoupler storage assembly, with the cradle mechanism, together with the multicoupler assembly, in a storage position.

Thus, by way of space 237 formed between main wall 235 and side walls 236 (space 237 accommodating connectors 227 projecting to the right of base 226 in FIG. 2), cradle mechanism 223 is configured for matingly receiving multicoupler assembly 222. Further, cradle mechanism 223 is configured for storing multicoupler assembly 222 and for selectively pivoting between the receiving position 230 associated with cradle mechanism 223 receiving multicoupler assembly 222 (FIGS. 2 and 5 showing cradle mechanism 223 in the receiving position 230, and FIG. 5 showing cradle mechanism 223, together with multicoupler assembly 222, in the receiving position 230) and the storage position 631 associated with cradle mechanism 223 storing multicoupler assembly 222 (FIG. 6 showing cradle mechanism 223, together with multicoupler assembly 222, in the storage position 631)(as explained more fully below). The numbered receiving and storage positions 230, 631 are made herein with specific reference to cradle mechanism 223; however, it is understood that, when multicoupler assembly 222 is mated and thereby attached to cradle mechanism 223, multicoupler assembly 222 occupies its own receiving position (when cradle mechanism 223 is in its receiving position 230) and storage position (when cradle mechanism 223 is in its storage position 631).

Spring 224 (which can also be referred to as a resilient member) can be a coil spring with opposing ends formed as open loops, one loop releasably attached to the through-hole of tab 320, the other loop releasably attached to the through-hole 340 of one of the guide pin receivers 234. Spring 224 can be attached to both the hole of tab 320 and guide pin receiver hole 340, as shown in FIGS. 2, 5, and 6. Spring 224 serves, in part, to keep cradle mechanism 223 in the proper position in order to insert multicoupler assembly 222 into, and couple multicoupler assembly 222 with, cradle mechanism 223, with respect to receiving position 230. With respect to storage position 631, spring 224 is stretched, maintaining connection in holes 320, 340.

Linchpin assembly 225 (which is shown in accordance with an exemplary embodiment of the present invention, but can be omitted as optional structure) can include a linchpin 241, a ring 242, and a retainer mechanism 243. Linchpin 241 and ring 242 can be, for example, made of steel. Linchpin 241 can have a head with a through-hole. Ring 242 can extend through the through-hole of linchpin 241, ring 242 for handling or otherwise manually manipulating linchpin 241 by an end user. Retainer mechanism 243 can be a rope, a string, a cable, or another suitable mechanism for tying and thereby attaching linchpin 241 to holder 216 by way of ring 242. That is, one end of retainer mechanism 243 can be attached to holder 216, and the other end of retainer mechanism 243 can be tied to ring 242. Linchpin 241, when not in use, can be stored in a hole 343 of a generally horizontal tab formed on holder 216. When in use, linchpin 241 can be removed from this hole 343 on holder 216 and inserted into another hole 344 on holder 216, which can be referred to as a locking hole 344, such that linchpin 241 extends substantially horizontal and across at least a portion of base 226 of multicoupler assembly 222. Though FIG. 2 shows only one such linchpin 241, it can be readily appreciated by the opposing locking hole 344 formed in holder 216 shown in FIG. 2 that another linchpin 241 can be positioned in the opposing locking hole 344 so as to further enhance the securing of multicoupler assembly 222 to cradle mechanism 223 in the storage position 631 of cradle mechanism 223 and that of multicoupler assembly 222. Alternatively, one long linchpin 241 can be used (rather than two shorter linchpins 241), extending through both locking holes 344. Thus, linchpin 241, whether one or more such linchpins 241, is configured for securing cradle mechanism 223, together with multicoupler assembly 222, in the storage position 631 of cradle mechanism 223 and that of multicoupler assembly 222.

Referring now to FIG. 5, there is shown holder 216 affixed to other portions of frame 114 and multicoupler assembly 222 inserted into cradle mechanism 223 using guide pins 228, with cradle mechanism 223 in receiving position 230 and multicoupler assembly 222 in its accompanying receiving position. More specifically, multicoupler assembly 222 is positioned adjacent to cradle mechanism 223 in mating fashion, with the right side of connectors 227 occupying space 237, guide pins 228 being in guide pin receivers 234, and walls 236 of base 232 of cradle mechanism 223 being aligned with base 226 of multicoupler assembly 222 so as to form an enclosure enclosing connectors 227 and thereby to seal off connectors 227 from the elements when cradle mechanism is in storage position 631 and multicoupler assembly 222 is in its accompanying storage position. Cradle mechanism 223 is shown in its receiving position 230 in FIG. 5, having received multicoupler assembly 222 (multicoupler assembly 222 can be said to be in its receiving position as well). Side pins 229 are poised to enter arcuate slots 221 when base 232 of cradle mechanism 223 pivots about bolt 233, and linchpin 241 is still in its unused position in hole 343 of holder 216. To move cradle mechanism 223 and multicoupler assembly 222 as a unit from the receiving position 230 to the storage position 631 of cradle mechanism 223, cradle mechanism 223 and multicoupler assembly 222 are moved as a unit down into slots 221 in the direction indicated by arrow 547.

Referring now to FIG. 6, there is shown holder 216 affixed to other portions of frame 114 and multicoupler assembly 222 inserted into cradle mechanism 223 using guide pins 228, with cradle mechanism 223 in storage position 631 and multicoupler assembly 222 in its accompanying storage position. More specifically, multicoupler assembly 222 is positioned adjacent to cradle mechanism 223 in mating fashion, as in FIG. 5. However, the primary difference between FIG. 5 and FIG. 6 is that cradle mechanism 223 is in storage position 631, with multicoupler assembly 222 in its accompanying storage position. An end user has moved side pins 229 into arcuate slots 221 of holder 216 and pivoted cradle mechanism 223 and thus also multicoupler assembly 222 as a single unit downward—that is, counter-clockwise (when viewing FIGS. 5-6)—until side pins 229 rest or otherwise seat against a respective end surface 345 of slots 221, the arcuate shape of slots 221 being configured to correspond with the track that side pins 229 make as cradle mechanism 223 and multicoupler assembly 222 pivot. As indicated in FIGS. 5-6, cradle mechanism 223 and multicoupler assembly 222 can pivot through an angular displacement of about fifty-five degrees, though this is not intended to be a limiting amount. Bi-directional arrow 646 in FIG. 6 indicates that cradle mechanism 223 can pivot about bolt 233 in either direction about an arc defined by slots 221. Linchpin 241 can be removed from its holding position in hole 343 of holder 216 and placed in hole 344, such that linchpin 241 can abut a side of base 226 of multicoupler assembly 222 or can otherwise block cradle mechanism 223 and multicoupler assembly 222 from moving back towards receiving position 230. Though only one such linchpin 241 is shown, it will be appreciated that two such linchpins 241 can be used, the other linchpin 241 being stored in a hole on holder 216 opposite hole 343 and being used for blocking in a hole on holder 216 opposite hole 344; alternatively, as indicated above, one long linchpin 241 can be used, extending through both holes 344, rather than a short linchpin 241 (as shown in the figures), or two such short linchpins 241. Though not shown, a padlock can be used in conjunction with linchpin 241, inserting a locking arm of the padlock through ring 242 and around the shaft of linchpin 241 to the left of side wall 218 of holder 216 in the foreground of FIG. 6. In the storage position 631 of cradle mechanism 223 and that of multicoupler assembly 222 shown in FIG. 6, base 232 of cradle mechanism 223 is seated atop base 226 of multicoupler assembly 222, both being substantially horizontal, such that base 232 of cradle mechanism 223 forms a sealed enclosure with base 223 of multicoupler assembly 222 that protects connectors 227 against dirt, debris, and moisture while being stowed. Further, the weight of multicoupler assembly 222 helps to retain multicoupler assembly 222 and cradle mechanism 223 together in storage positions 631 of cradle mechanism 223 and that of multicoupler assembly 222. Stated another way, cradle mechanism 223, the at least one side pin 229, and the at least one slot 221 co-act and thereby together at least partially hold multicoupler assembly 222 in a horizontal position as cradle mechanism 223 is atop, and thereby covers, multicoupler assembly 222 when cradle mechanism 223 is in its storage position 631. Even so, linchpin(s) 241 are provided for positive retention. Further, each slot 221 is shaped and dimensioned relative to pivot 233 such that there is a shorter distance from side pin 229 to pivot 233 when multicoupler assembly 222 and cradle mechanism 223 are in storage position 631 compared to when multicoupler assembly 222 and cradle mechanism 223 initially enter slot 221 by way of side pins 229. As a result, multicoupler assembly 222 and thus also cradle mechanism 223 are held tight in storage position 631, the tightness increasing as multicoupler assembly 222 and cradle mechanism 223 proceed from receiving position 230 to storage position 631. Further, each slot 221 is configured to close any gap existing between multicoupler assembly 222 and cradle mechanism 223 as multicoupler assembly 222 and cradle mechanism 223 rotate from receiving position 230 to storage position 631.

In use, an end user, such as an operator of combine 100, may initially find cradle mechanism 223 and multicoupler assembly 222 in their respective storage positions, as shown in FIG. 6. To use multicoupler assembly 222, the operator can remove linchpin 241 from hole 344 and insert linchpin 241 into hole 343. The operator pivots cradle mechanism 223 and thus also multicoupler assembly 222 as a unit upward back out of slots 221. Spring 224 stays attached to hole 340 of guide pin receiver 234 so as to hold cradle mechanism 223 in its receiving position 230. Multicoupler assembly 222 is pulled away from cradle mechanism 223 and is detached thereby. Multicoupler assembly 222 can then be employed by attaching it to a coupling mechanism of combine 100 (or vice versa, if multicoupler storage assembly 115A is being used). When the operator is finished using header 110 or otherwise needs to transport header 110, the operator can detach multicoupler assembly 222 from the combine 100 and stow away multicoupler assembly 222 on header 110 for future use. To do so, multicoupler assembly 222 is again mated with base 232 of cradle mechanism 223, spring 224 stays attached to hole 340 in guide pin receiver 234, and base 232 of cradle mechanism 223 is pivoted downwards so that side pins 229 are fully inserted into slots 221 and slide all the way to the end surface 345 of slots 221 and thus seat therein. Cradle mechanism 223 and multicoupler assembly 222 are now substantially horizontal, and linchpin(s) 241 can be inserted into holes 344 so as to secure cradle mechanism 223 and multicoupler assembly 222 in their respective storage positions as a unit. Thus, linchpin 241 serves to positively secure cradle mechanism 223 and multicoupler assembly 222 in the respective storage position as a unit, for example, when header 110 is transported, so that multicoupler assembly 222 does not become disengaged from its storage position and potentially receive damage. Alternatively, if multicoupler storage assembly 115A were used, it could be operated in the same way as multicoupler storage assembly 115, except that assembly 115A would be attached to, for example, feeder housing 120 (or to the frame associated with feeder housing 120), such as by way of a holder similar to holder 216, as indicated above (the way of attaching the holder to structure associated with feeder housing 120 could be adapted so as to be suitable under that scenario).

Figure 7:
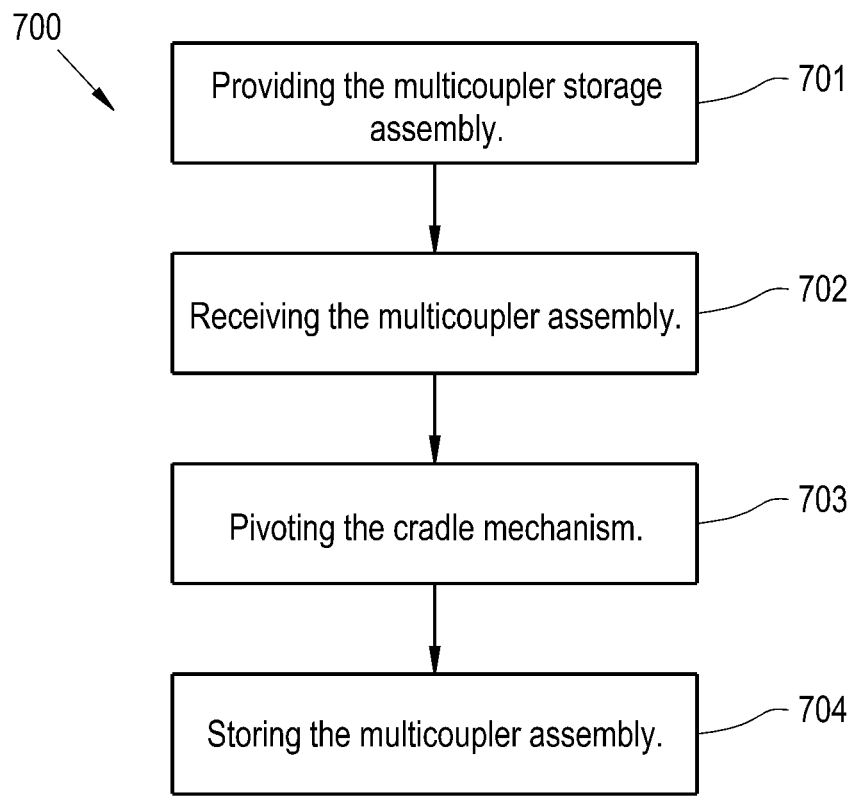
FIG. 7 illustrates a flow diagram showing a method of using the multicoupler storage assembly of the header assembly of the agricultural vehicle, in accordance with an exemplary embodiment of the present invention.

Referring now to FIG. 7, there is shown a flow diagram of a method 700 of using multicoupler storage assembly 115 of agricultural harvester 100 including header assembly 110. Method 700 includes the steps of: providing 701 multicoupler storage assembly 115, which includes multicoupler assembly 222 and cradle mechanism 223, multicoupler assembly 222 including a plurality of hydraulic and/or electrical connectors 227; receiving 702 multicoupler assembly 222 by cradle mechanism 223; pivoting 703, selectively, cradle mechanism 223 between a receiving position 230 associated with cradle mechanism 223 receiving multicoupler assembly 222 and a storage position 631 associated with cradle mechanism 223 storing multicoupler assembly 222; and storing 704 multicoupler assembly 222 by cradle mechanism 223. Thus, multicoupler storage assembly 115 can be coupled with header 110, or, alternatively, multicoupler storage assembly 115A can be coupled with feeder housing 120 (or to the frame associated with feeder housing 120). Header assembly can include frame 114 and multicoupler storage assembly 115, frame 114 including holder 216, cradle mechanism 223 being pivotably connected to holder 216 and configured for matingly receiving multicoupler assembly 222. Method 700 can further include the step of sliding at least one side pin 229 of multicoupler assembly 222 in at least one slot 221 of holder 216 when cradle mechanism 223 moves, together with multicoupler assembly 222, between receiving position 230 and storage position 631. Cradle mechanism 223, the at least one side pin 229, and the at least one slot 221 together at least partially hold multicoupler assembly 222 in a horizontal position as cradle mechanism 223 is atop, and thereby covers, multicoupler assembly 222 when cradle mechanism 223 is in storage position 631. Method 700 can (optionally) further include the step of securing, by linchpin 241 of multicoupler storage assembly 115, cradle mechanism 223, together with multicoupler assembly 222, in storage position 631. Multicoupler storage assembly 115 includes resilient member 224 that releasably retains cradle mechanism 223 in the receiving position.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:

1. A header assembly of an agricultural harvester, the header assembly comprising:
   a frame;
   a multicoupler storage assembly at least partially coupled with the frame, the multicoupler storage assembly including:
      a multicoupler assembly including a base panel and a plurality of at least one of hydraulic connectors and electrical connectors connected to the base panel, wherein the plurality of at least one of hydraulic connectors and electrical connectors are connected to mating connectors on the agricultural harvester during an operative state of the header assembly and disconnected from the mating connectors on the agricultural harvester during an inoperative state of the header assembly; and
      a cradle mechanism coupled with the frame, the multicoupler assembly stored by the cradle mechanism during the inoperative state of the header assembly, and the cradle mechanism configured for selectively pivoting between a receiving position associated with the cradle mechanism receiving the multicoupler assembly and a storage position associated with the cradle mechanism storing the multicoupler assembly during the inoperative state of the header assembly.

2. The header assembly of claim 1, wherein the frame includes a holder, the cradle mechanism being pivotably connected to the holder and configured for matingly receiving the multicoupler assembly.

3. The header assembly of claim 2, wherein the multicoupler assembly includes at least one side pin extending from the base panel, the holder including at least one slot configured for slidably receiving the at least one side pin when the cradle mechanism moves, together with the multicoupler assembly, between the receiving position and the storage position.

4. The header assembly of claim 3, wherein the cradle mechanism, the at least one side pin, and the at least one slot together at least partially hold the multicoupler assembly in a horizontal position as the cradle mechanism is atop, and thereby covers, the multicoupler assembly when the cradle mechanism is in the storage position.

5. The header assembly of claim 4, wherein the multicoupler storage assembly includes a linchpin configured for securing the cradle mechanism, together with the multicoupler assembly, in the storage position.

6. The header assembly of claim 1, wherein the multicoupler assembly is detached from the cradle mechanism during the operative state of the header assembly, and wherein the cradle mechanism is fixed to the header assembly in both the operative and inoperative states of the header assembly.

7. An agricultural harvester including a header assembly, the agricultural harvester comprising:
a multicoupler storage assembly including:
a multi coupler assembly including a base panel and a plurality of at least one of hydraulic connectors and electrical connectors connected to the base panel, wherein the plurality of at least one of hydraulic connectors and electrical connectors are connected to mating connectors on the agricultural harvester during an operative state of the header assembly and disconnected from the mating connectors on the agricultural harvester during an inoperative state of the header assembly; and
a cradle mechanism storing the multicoupler assembly during the inoperative state of the header assembly, and selectively pivoting between a receiving position associated with the cradle mechanism receiving the multicoupler assembly and a storage position associated with the cradle mechanism storing the multicoupler assembly during the inoperative state of the header assembly.

8. The agricultural harvester of claim 7, wherein the header assembly includes a frame and the multicoupler storage assembly, the frame including a holder, the cradle mechanism being pivotably connected to the holder and configured for matingly receiving the multicoupler assembly.

9. The agricultural harvester of claim 8, wherein the multicoupler assembly includes at least one side pin extending from the base panel, the holder including at least one slot configured for slidably receiving the at least one side pin when the cradle mechanism moves, together with the multicoupler assembly, between the receiving position and the storage position.

10. The agricultural harvester of claim 9, wherein the cradle mechanism, the at least one side pin, and the at least one slot together at least partially hold the multi coupler assembly in a horizontal position as the cradle mechanism is atop, and thereby covers, the multicoupler assembly when the cradle mechanism is in the storage position.

11. The agricultural harvester of claim 10, wherein the multi coupler storage assembly includes a linchpin configured for securing the cradle mechanism, together with the multicoupler assembly, in the storage position.

12. The agricultural harvester of claim 7, wherein the multicoupler assembly is detached from the cradle mechanism during the operative state of the header assembly, and wherein the cradle mechanism is fixed to the header assembly in both the operative and inoperative states of the header assembly.

13. A method of using a multi coupler storage assembly of an agricultural harvester including a header assembly, comprising the steps of:
providing the multicoupler storage assembly, which includes a multicoupler assembly and a cradle mechanism, the multi coupler assembly including a base panel and a plurality of at least one of hydraulic connectors and electrical connectors connected to the base panel, wherein the plurality of at least one of hydraulic connectors and electrical connectors are connected to mating connectors on the agricultural harvester during an operative state of the header assembly and disconnected from the mating connectors on the agricultural harvester during an inoperative state of the header assembly,
removing the multicoupler assembly from the agricultural harvester during the inoperative state of the header assembly;
receiving the multicoupler assembly by the cradle mechanism during the inoperative state of the header assembly;
pivoting, selectively, the cradle mechanism between a receiving position associated with the cradle mechanism receiving the multicoupler assembly and a storage position associated with the cradle mechanism storing the multicoupler assembly; and
storing the multicoupler assembly by the cradle mechanism during the inoperative state of the header assembly.

14. The method of claim 13, wherein the header assembly includes a frame and the multicoupler storage assembly, the frame including a holder, the cradle mechanism being pivotably connected to the holder and configured for matingly receiving the multicoupler assembly.

15. The method of claim 14, further including the step of sliding at least one side pin of the multicoupler assembly in at least one slot of the holder when the cradle mechanism moves, together with the multicoupler assembly, between the receiving position and the storage position.

16. The method of claim 15, wherein the cradle mechanism, the at least one side pin, and the at least one slot together at least partially hold the multi coupler assembly in a horizontal position as the cradle mechanism is atop, and thereby covers, the multicoupler assembly when the cradle mechanism is in the storage position.

17. The method of claim 16, further including the step of securing, by a linchpin of the multicoupler storage assembly, the cradle mechanism, together with the multicoupler assembly, in the storage position.

18. The method of claim 13, wherein the multicoupler assembly is detached from the cradle mechanism during the operative state of the header assembly, and wherein the cradle mechanism is fixed to the header assembly in both the operative and inoperative states of the header assembly.

* * * * *